Nov. 1, 1932.    J. SPECTOR    1,885,150
SUN AND RAIN PROTECTOR FOR RUMBLE SEATS
Filed June 20, 1932    2 Sheets-Sheet 1
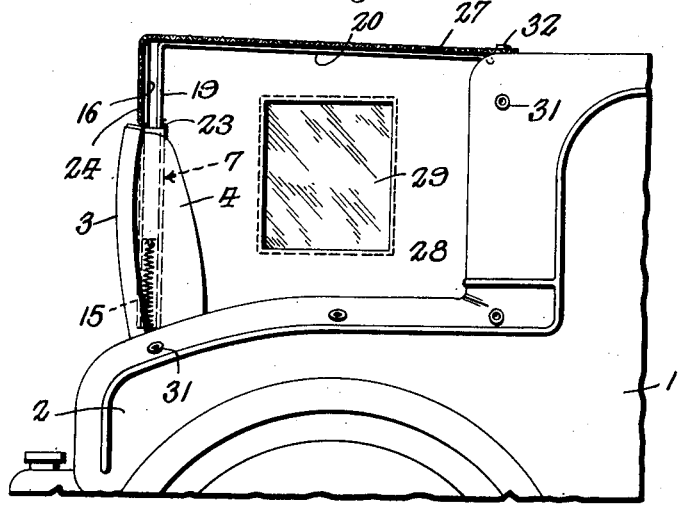
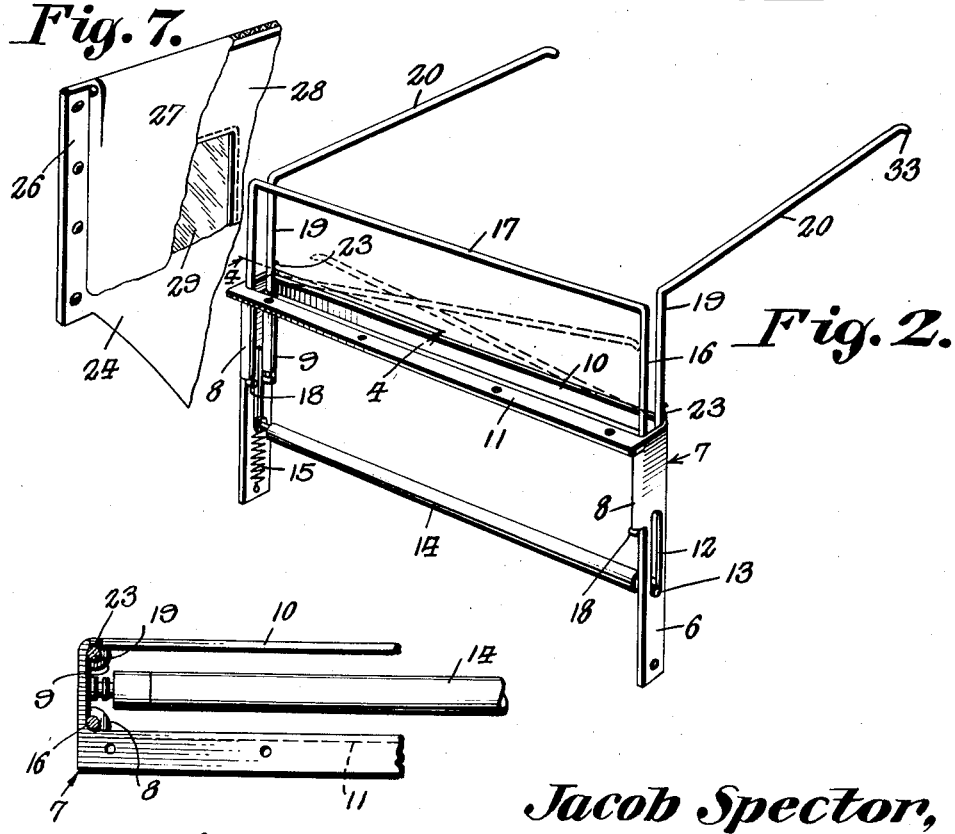
Jacob Spector,
INVENTOR
BY *Victor J. Evans & Co.*
ATTORNEY

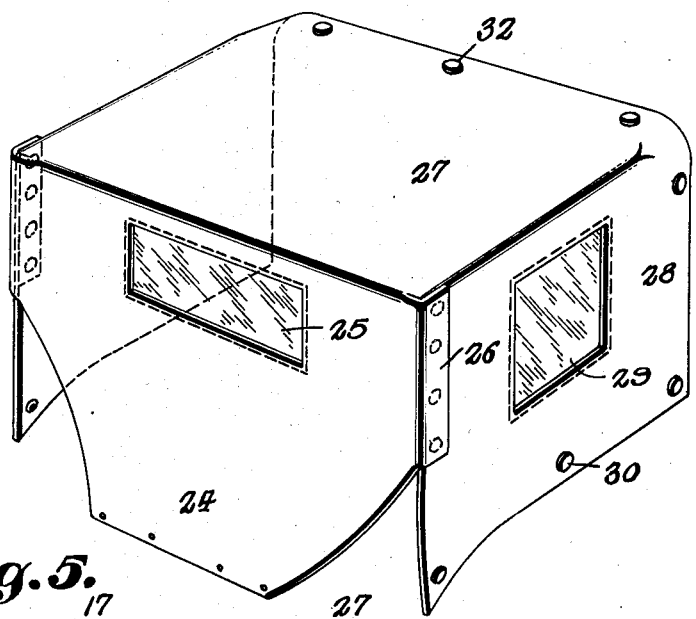
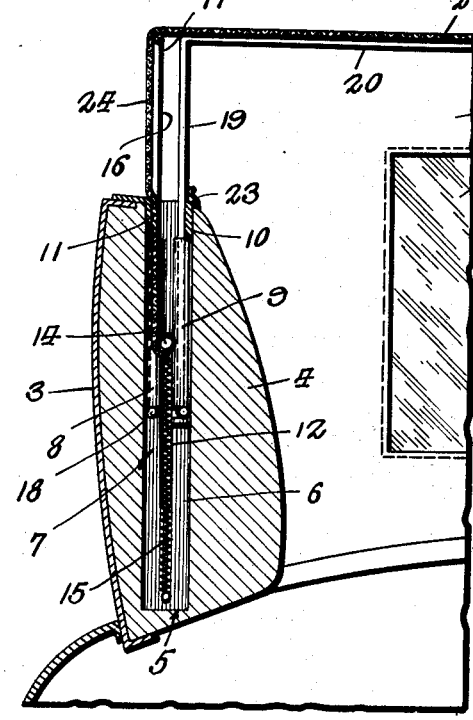
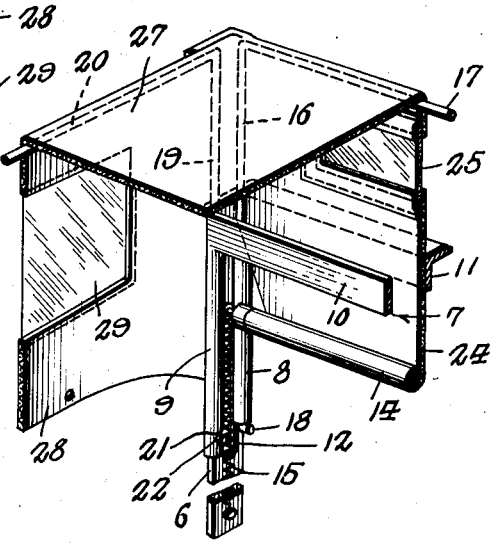

Patented Nov. 1, 1932

1,885,150

UNITED STATES PATENT OFFICE

JACOB SPECTOR, OF KEYSTONE, WEST VIRGINIA

SUN AND RAIN PROTECTOR FOR RUMBLE SEATS

Application filed June 20, 1932. Serial No. 618,316.

The object of this, my present invention, is the provision of a new and novel top or canopy structure for automobile rumble seats.

A further object of the invention is the provision of a top structure for rumble seats which shall be of an extremely simple construction, easily and quickly brought into active position to afford a rain and sun protector for the occupants of the rumble seat and as readily folded upon itself and automatically brought into a pocket, provided therefor, in the back cushion of the rumble seat.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of a sufficient portion of an automobile to illustrate the improvement in applied position thereon.

Figure 2 is a perspective view of the frame of the improvement.

Figure 3 is a similar view of the top or canopy.

Figure 4 is a detail sectional view on the line 4—4 of Figure 2.

Figure 5 is an enlarged transverse sectional view through the rumble portion of the automobile with the back cushion in set up position and also illustrating the improvement in set up condition.

Figure 6 is a fragmentary perspective view of the improvement in set up position.

Figure 7 is a fragmentary sectional perspective view showing the canopy folded.

In the drawings the numeral 1 designates an automobile body of the type provided with a rumble seat portion 2. The rumble portion is provided with the usual opening in the top thereof for the rumble seat and this opening is normally closed by a cover 3, the inner face of the said cover being curved in a line to provide the back cushion 4.

In the present instance the back cushion, from the end thereof that affords the top, when the cushion is in upright position, is formed with a substantially rectangular pocket 5 and in this pocket there is received and fixed the substantially inverted U-shaped guide frame that forms an abutting element of the improvement. The sides 6 of this frame structure 7 have their edges, adjacent to their upper ends, rolled upon themselves to provide spaced sleeves 8 and 9, respectively. The outer edges of the sides 6 are connected together by plates 10 and 11, respectively, and the upper edge of the plate 10 is formed with an outstanding flange 11, flush with the outer ends of the sides 6 and this flange is bolted or otherwise secured to the said end of the metal cover 3 for the back cushion 4.

The sides 6 of the frame member 7 are provided with alining vertically arranged elongated openings 12, and these openings afford guides for the pintles or trunnions 13 that project through the ends of a spring wound roller 14. Coiled pressure springs 15 are secured to the respective trunnions 13 and the respective sides 6 of the member 7.

Guided for vertical movement through the rear sleeves 8 there are the parallel arms 16 of an inverted substantially U-shaped rod 17. The rod 17 affords the support for the rear of the top or canopy and the arms 16 have their lower ends offset, as at 18, so that the same cannot be drawn through the sleeves 8.

Designed to be slidably received through the inner sleeves 9 there are the vertical arms 19 of angle rods, the horizontal elements of which being indicated by the numeral 20. The angle rods also have the ends of the arms 19 offset, as at 21, and these offset ends may be received in notches 22 in the lower portions of the sleeves 9 for limiting the outward movement of the arms 19 through the said sleeves, or, as disclosed by the dotted lines in Figure 5 of the drawings the arms 19 will be slotted for pivotally supported spring influenced latches 23 that contact with the upper edge of the plate 10 of the frame 7 which prevents the free downward movement of the arms 19. If desired both latching means above described may be employed and it is also within the province of this invention to provide other means that will prevent the arms 19 being fully withdrawn from the sleeves 9 and hold the said arms when withdrawn from the sleeves for a predetermined distance.

On the spring wound roller 14 there is secured the lower end of the rear or back portion 24 of the top or canopy proper. The top or canopy is of fabric material which is waterproof and the portion of the back 24 that is secured to the roller is reduced with respect to the width of the back proper. The back is provided with a window 25 of celluloid or like material and the ends of the back are formed with extensions in the nature of foldable tabs 26. The top of the canopy, indicated by the numeral 27, is integrally formed with the back 24 but is designed to be bent rightangularly thereover on a suitable score or fold line and the sides 28 are formed with the top and are bent at right angles therefrom on suitable fold or score lines. The sides 28 are provided with windows 29 and the said sides are not connected to the back. The tabs 26 are provided with fastening elements to coengage with similar fastening elements on the rear edges of the sides 28, and the lower and front edges of the sides are provided with catch elements 30 to coengage with other catch elements 31 on the rumble portion 2 and on the rear portion of the body of the automobile 1, while the top 27 has at its forward end catch elements 32 to engage with cooperating elements on the top of the automobile. The catch elements are so arranged that the same can be operated from the rumble portion of the automobile by the occupants thereof so that it is not necessary that the occupants remove themselves from the rumble seat in setting up or collapsing the improvement.

When the device is to be set up the rod members 17 are pulled through the sleeves 8 and 9. The longitudinal arms 20 of the rods 19 are initially in the position disclosed by dotted lines in Figure 3 and, therefore, in a position to be arranged in the open top of the frame member 7. The rods 19, however, are turned to the full line position in Figure 2 so that the offset outer ends 33 thereof will be received in depressions or in a gutter at the rear of the top of the automobile. The outward movement of the rods draws the canopy out of the pocket 5 so that the rod 17 will contact with the score line between the back 24 and the top 27. This permits of the sides dropping downwardly from the rods 20 in a line with the score line that divides the said sides 28 from the top 27. The cooperating latch members between the canopy and the vehicle are so spaced that the occupants of the rumble seat will place their hands between the edges of the canopy, and the catch elements carried thereby to bring such catch members into coengagement with the catch members of the automobile and in a like manner the operator may pass one of his hands between the ends of the back 4 and the flaps 26 to swing the flaps against the sides to bring the catch elements carried by the sides and the flaps to interengagement. The tabs may be readily separated from the sides and the sides and top may be readily detached from the automobile. This, of course, is only when the canopy is not desired for use.

When the canopy and the supports therefor are to be moved into the pocket 5 the sides 28 are swung toward each other against the inner face of the top 27 and the top 27, with the folded sides thereof, is folded against the back 24. Of course, the arms 20 of the rods 19 are brought between these folded portions and when the arms 20 are swung to be received in the frame 7 the latching means between the arms 19 and the frame will be released so that the rods, with the folded canopy thereon will be automatically brought into the pocket by the spring 15. The spring wound roller 14 not only serves as a means for automatically forcing the structure into the pocket but as a tensioning device for holding the parts constituting the canopy tight against the rods 17 and 20 when the top is in set-up condition.

It is believed that when the foregoing description has been read in connection with the accompanying drawings that the construction and advantages of the improvement will be fully understood and appreciated without further detailed description.

Having described the invention, I claim:

1. In combination with the back rest for the rumble seat of an automobile having a transversely arranged pocket entering from the outer end thereof, a frame having an open top received in the pocket and secured to the back cushion and likewise having its ends, for a distance from its top, formed with sleeves, the sides of the said frame having alining elongated slots, a spring wound roller journaled in said slots, spring means urging the roller toward the ends of the slots, a substantially U-shaped member having its sides received in two of the adjacent sleeves, rightangular members having one of their arms received in the remaining pair of sleeves, and said spring wound roller having attached thereto the rear of a canopy that comprises a top and sides, which sides are divided from the back and said back having flaps to be removably attached to the sides, and means between the sleeves and the rightangular members for holding the said members as well as the U-shaped members rigidly when partly withdrawn from the sleeves as when the canopy is in set up position.

2. A sun and rain protector for the rumble seats of automobiles, and which automobile is provided with a swingable back cushion for the rumble seat, and said cushion having a pocket entering from its outer end, said device including a frame let in the pocket and secured to the back cushion, a substantially U-shaped member having its parallel arms guided on the frame and movable into the frame, rightangular members having their vertical branches guided on the frame and movable into the frame, means for latching these members when moved outward of the frame and the horizontal branches of the rightangular members being swingable over the top of the automobile, a canopy which includes a back flap that is spring influenced into the pocket and which is guided over the substantially U-shaped member, a top on the back flap and sides depending from the top, and said back flap having foldable tabs provided with latching means for attaching the same to the sides and the said sides and top having latch means for connecting the same to the sides and to the top of the vehicle and said canopy, when the elements comprising the same are folded and the angle members are swung together to release the latching means therefor, being foldable on itself and on said angle members and substantially U-shaped member and movable with said members into the pocket.

In testimony whereof I affix my signature.

JACOB SPECTOR.